United States Patent [19]

Nam et al.

[11] Patent Number: 5,777,781
[45] Date of Patent: *Jul. 7, 1998

[54] OPTICAL PROJECTION SYSTEM

[75] Inventors: Seong-Woo Nam; Zu-Seong Hwang, both of Seoul, Rep. of Korea

[73] Assignee: Daewoo Electronics Co., Ltd., Seoul, Rep. of Korea

[*] Notice: The term of this patent shall not extend beyond the expiration date of Pat. No. 5,612,814.

[21] Appl. No.: 739,251

[22] Filed: Oct. 29, 1996

[51] Int. Cl.$^6$ ................................................ G02B 26/00
[52] U.S. Cl. ...................... 359/291; 359/212; 359/846; 359/850
[58] Field of Search ........................ 359/290, 291, 359/292, 293, 294, 295, 212, 213, 214, 846, 847, 850

[56] References Cited

U.S. PATENT DOCUMENTS

| | | | |
|---|---|---|---|
| 5,541,679 | 7/1996 | Yang | 353/98 |
| 5,612,814 | 3/1997 | Yang | 359/291 |
| 5,657,036 | 8/1997 | Markandey et al. | 345/85 |

*Primary Examiner*—Georgia Y. Epps
*Assistant Examiner*—Dawn-Marie Bey
*Attorney, Agent, or Firm*—Anderson, Kill & Olick, P.C.

[57] ABSTRACT

An optical projection system, displaying an image of pixels on a projection screen, includes a light source for generating a white light beam, wherein the white light beam has a first, a second and a third primary light components, each of the primary light components being one of the primary colors, a pixel filter for filtering the white light beam into each of the primary light beams of each of the primary light components, wherein the pixel filter made of a set of R, G, B color sections, and an array of M×N actuated mirrors provided with an active matrix, M and N being positive integers, respectively, each of the actuated mirrors being capable of reflecting the white light beam from the light source to any one of the color sections and modulating an intensity of the light beam passing through the pixel filter in response to an electric signal applied to the active matrix. In the system, the electric signal includes a plurality of time interval corresponding to a pixel driving time, wherein each time interval is divided into three time slots to be allocated to the color sections, respectively.

7 Claims, 4 Drawing Sheets

OPTICAL PROJECTION SYSTEM

FIELD OF THE INVENTION

The present invention relates to an optical projection system; and, more particularly, to an optical projection system incorporating therein a pixel filter having a set of RGB color sections.

BACKGROUND OF THE INVENTION

Among the various video display systems available in the art, an optical projection system is known to be capable of providing high quality images in a large scale.

In FIG. 1, there is presented a schematic view of a prior art optical projection system 100, disclosed in commonly owned U.S. Pat. No. 5,612,814, entitled "COMPACT SIZED OPTICAL PROJECTION SYSTEM", the optical projection system including: a non-point white light source 110, a source lens 120, a source stopper 122 provided with a source aperture 124, an optical mirror 130 having a reflection surface 132, a field lens 152, an array 150 of M×N RGB pixel filters, M and N being positive integers, respectively, a projection stopper 160 provided with a projection aperture 162, a projection lens 170, a projection screen 180 and an array 140 of 3M×N thin film actuated mirrors 142.

In such a system, a white light beam emanating from the non-point white light source 110 is focused along a first optical path on the source stopper 122 by the source lens 120, wherein the white light beam has a first, a second and a third primary light components, each of the primary light components being one of the primary colors. The source stopper 122 is used for shaping the white light beam emanated from the nonpoint white light source 110 after it passes through the source lens 120 into a predetermined configuration by allowing a certain portion of the white light beam to pass through the source aperture 124 thereof. The white light beam transmitted through the source stopper 122 having the predetermined configuration is partially reflected from the reflection surface 132 of the optical mirror 130, wherein the reflection surface 132 is in a facing relationship with the field lens 152 and the source stopper 122, respectively. The portion of the white light beam reflected from the reflection surface 132 of the optical mirror 130 diverges along a second optical path and is collimated by the field lens 152, thereby being uniformly projected onto the array 150 of M×N RGB pixel filters, wherein the array 150 of M×N RGB pixel filters is disposed between the field lens 152 and the array 140 of thin film actuated mirrors 142 and is in a facing relationship with the array 140 of thin film actuated mirrors 142. Each of the RGB pixel filters in the array 150 receives the white light beam collimated by the field lens 152, converts the collimated white light beam into a first, a second and a third primary light beams, and transmits the primary light beams to the array 140 of the thin film actuated mirrors 142. Each of the thin film actuated mirrors 142 in the array 140 has a mirror 148 and an actuator 144 wherein the actuator 144 is electrically connected to an active matrix 146 and made of a piezoelectric or an electrostrictive material which deforms in response to an electric signal from the active matrix 146. Each of the thin film actuated mirrors 142 in the array 140 corresponds to one of the pixels to be displayed.

A third optical path of the primary light beams reflected from each of the thin film actuated mirrors 142 in the array 140 is determined by the amount of deformation of the actuator 144 in each of the thin film actuated mirrors 142 in the array 140.

The primary light beams reflected from each of the thin film actuated mirrors 142 in the array 140 travel along the third optical path and are focused on the projection stopper 160 by the field lens 152 after repassing through the array 150 of M×N RGB pixel filters. As the optical mirror 130 is so arranged to be out of the third optical path of the primary light beams, the primary light beams reflected from each of the thin film actuated mirrors 142 in the array 140 are focused directly on the projection stopper 160 by the field lens 152.

The intensity of the primary light beams projected on the screen is determined by the amount of the primary light beam passing through the projection aperture 162 of the projection stopper 160 which is modulated by adjusting the amount of the deflection of the thin film actuated mirrors 142 in the array 140. The primary light beams which pass through the projection aperture 162 of the projection stopper 160 travel to the projection lens 170 which projects the primary light beams transmitted from the projection aperture 162 on the projection screen 180, thereby displaying the image made up of M×N number of the pixels, each of the pixels having a set of RGB pixels.

The above-described optical projection system, however, requires the array 140 to have 3M×N number of thin film actuated mirrors 142 for color displaying an image of M×N pixels.

SUMMARY OF THE INVENTION

It is, therefore, a primary object of the present invention to provide an optical projection system incorporating therein a pixel filter, thereby reducing the number of thin film actuated mirrors in the optical projection system.

In accordance with the present invention, there is provided an optical projection system capable of displaying an image having M×N pixels, M and N being positive integers, respectively, on a projection screen comprising: a light source for generating a collimated light beam, wherein the collimated light beam has a first, a second and a third primary light components, each of the primary light components being one of primary colors; a pixel filter for filtering the collimated light beam into each of primary light beams of primary light components, wherein the pixel filter is made of a set of R, G, B color sections; and an array of M×N actuated mirrors provided with an active matrix, each of the actuated mirrors for being capable of reflecting the collimated light beam from the light source to any one of the color sections and modulating an intensity of the reflected light beam passing through the pixel filter in response to an electric signal applied to the actuated mirrors by the active matrix, thereby displaying the image on the projection screen.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
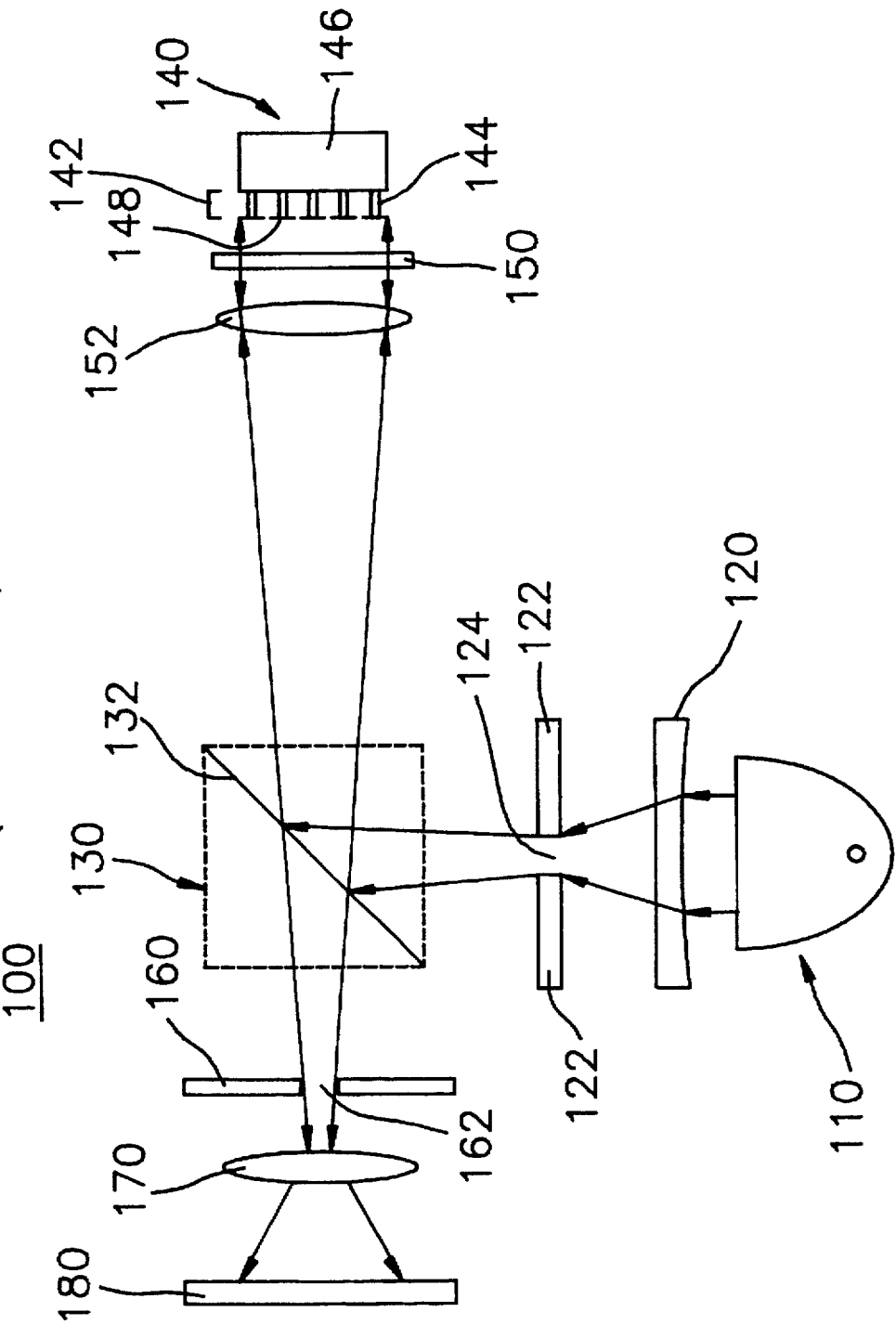
FIG. 1 presents a schematic view of a prior art optical projection system.
Figure 2:
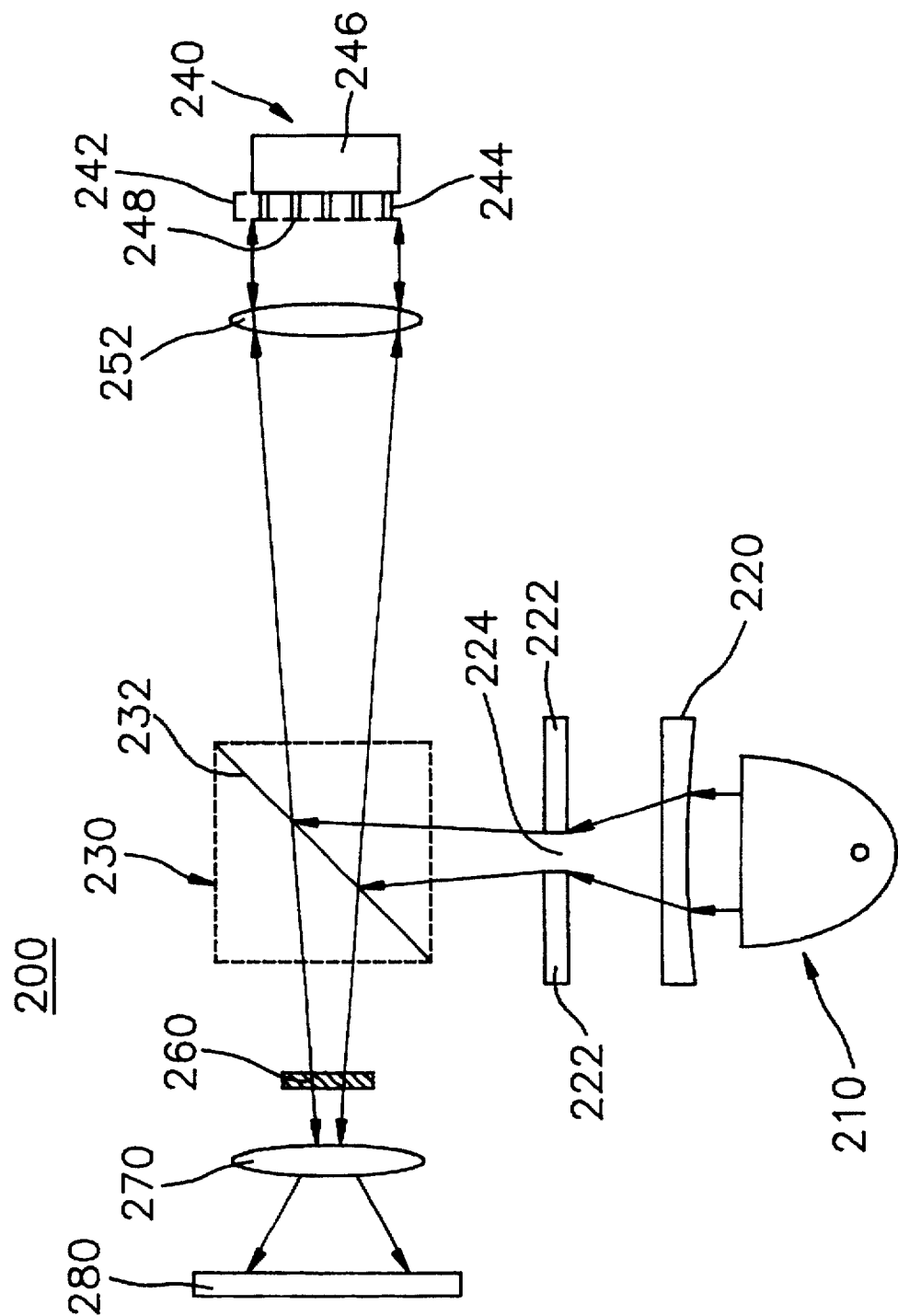
FIG. 2 illustrates a schematic view of an optical projection system in accordance with a preferred embodiment of the present invention.

There is illustrated in FIG. 2, an optical projection system 200 which includes a light source 210, a source lens 220, a source stopper 222 provided with a source aperture 224, a mirror 230 having a reflection surface 232, a field lens 252, an array 240 of M×N thin film actuated mirrors 242, a pixel filter 260, a projection lens 270 and a projection screen 280, wherein M and N are positive integers, e.g., 640 and 480, respectively, and indicate numbers of rows and columns in the array 240, respectively.

In the system, a white light beam generated from the light source 210 is focused along a first optical path on the source aperture 224 of the source stopper 222 by the source lens 220 located between the light source 210 and the source stopper 222, wherein the first optical path is defined as the path for the white light beam traveling from the light source 210 to the reflection surface 232. The white light beam has a first, a second and a third primary light components, each of the primary light components being one of the primary colors. The source stopper 222 is used for shaping the white light beam generated from the light source 210 after the beam passes through the source lens 220 into a predetermined configuration by allowing a certain portion of the white light beam to pass through the source aperture 224 thereof. The portion of the white light beam passed through the source stopper 222 having the predetermined configuration travels onto the mirror 230. The reflection surface 232 of the mirror 230 is in a facing relationship with the source stopper 222 and the field lens 252. The portion of the white light beam reflected from the reflection surface 232 of the mirror 230 diverges along a second optical path and is collimated by the field lens 252, thereby being uniformly projected onto the array 240 of M×N thin film actuated mirrors 242, wherein the second optical path is defined as the path for the reflected white light beam traveling from the reflection surface 232 to the array 240 of M×N thin film actuated mirrors 242. The field lens 252 is located between the mirror 230 and the array 240 of M×N thin film actuated mirrors 242. The array 240 includes M×N thin film actuated mirrors 242 and an active matrix 246. Each of the M×N thin film actuated mirrors 242 is provided with an actuator 244 and a mirror 248, wherein the actuator 244 is made of a piezoelectric or an electrostrictive material which deforms in response to an electric signal from the active matrix 246 to thereby allow an optical path of the light beam reflected from the array 240 to be modulated based on the deformation amount of the actuator 244. Each of the M×N thin film actuated mirrors 242 in the array 240 corresponds to one of the pixels to be displayed, wherein each of the pixels includes a set of R, G, B components.

A third optical path of the white light beam reflected from each of the thin film actuated mirrors 242 in the array 240 is determined by the amount of deformation of the actuator 244 in each of the thin film actuated mirrors 242 in the array 240. The third optical path is defined as the traveling path of the white light beam reflected from the array 240 of M×N thin film actuated mirrors 242 to the pixel filter 260. When each of the actuators 244 is not modulated, the third optical path is so arranged to be inclined at a predetermined angle with respect to an optical plane including both of the first and the second optical paths. It should be noted that the RGB color sections 262, 264, 266 be arranged in accordance with the actuating direction of the actuator 244.

The mirror 230 is arranged to be out of the third optical path of the white light beam. Therefore, the white light beam reflected from each of the M×N thin film actuated mirrors 242 in the array 240 travels along the third optical path and is focused directly on the pixel filter 260 by the field lens 252.

Figure 3:
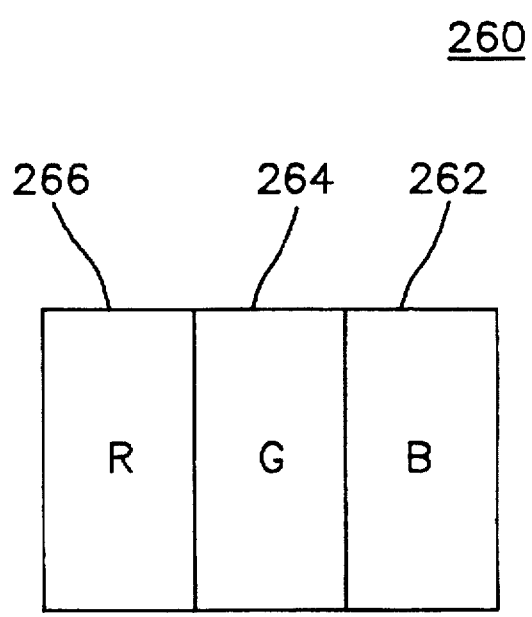
FIG. 3 depicts a plan view of a set of RGB pixel filters in the optical projection system shown in FIG. 2.

Referring to FIG. 3, there is illustrated a plan view of the pixel filter 260 in the optical projection system 200 shown in FIG. 2, wherein the pixel filter 260 has a first, a second and a third color sections 262, 264, 266 for filtering the white light beam into a red, a green and a blue light beams, respectively. When the mirror 248 is actuated to be at a red position, the third optical path of the light beam reflected from the mirror 248 is aligned with the first color section 262 of the pixel filter 260. And also, if the mirror 248 is actuated to be at a green and a blue positions, the third optical path is aligned with the second and the third color sections 264, 266, respectively. The intensity of the light beam transmitted to each of the color sections 262, 264, 266 of the pixel filter 260 is modulated by the electric signal applied to the actuator 244 by the active matrix 246.

Figure 4:
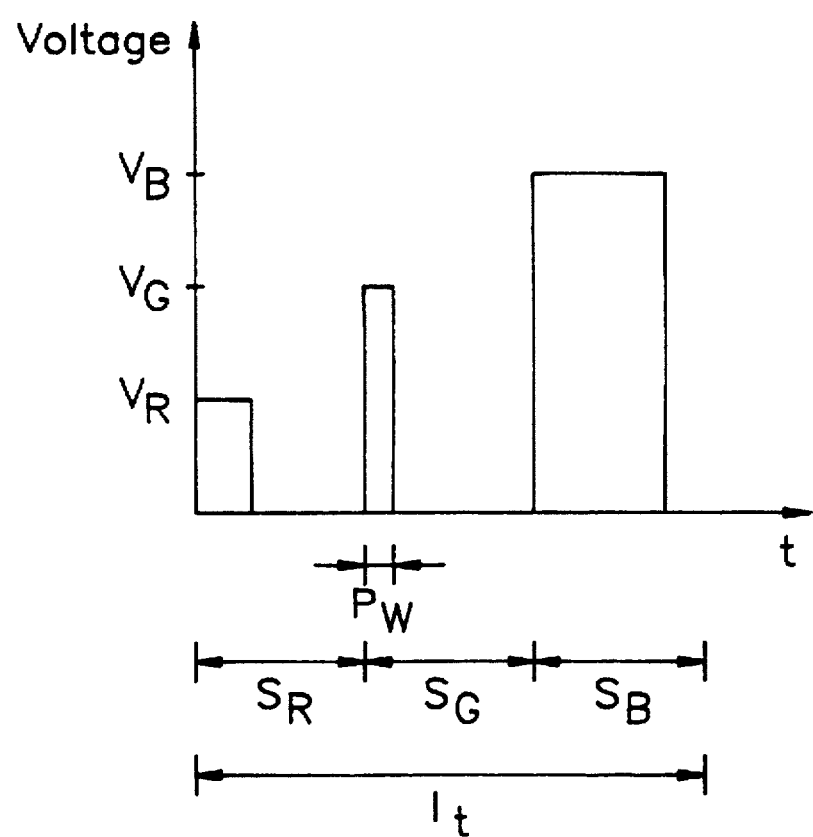
FIG. 4 represents a graph showing a waveform of the electric signal applied to an active matrix in an array of M×N thin film actuated mirrors.

Referring to FIG. 4, there is represented a graph showing a waveform of the electric signal applied to the thin film actuated mirror 242 in the array 240 by the active matrix 246. The electric signal comprises a plurality of time intervals $I_T$, each of the time intervals $I_T$ being associated with a pixel driving time. Each of the time intervals $I_T$ is divided into three time slots $S_R$, $S_G$ and $S_B$ so that the time slots $S_R$, $S_G$ and $S_B$ can be allocated to the color sections 262, 264, 266, respectively. The amplitude of each pulse allocated in each of time slots $S_R$, $S_G$ and $S_B$ has one of three predetermined values $V_R$, $V_G$ and $V_B$, each predetermined value corresponding to a value actuating a corresponding mirror to be at the red, green or blue position and the pulse width $P_W$ can take on any one of different gradation values, e.g., $256(=2^8)$ different pulse width. A pulse width in a time slot is proportional to the time duration for a corresponding mirror 248 to be at a corresponding red, green or blue position.

Referring back to FIG. 2, a primary light beam which is filtered through one of the color sections 262, 264, 266 of the pixel filter 260 travels through the projection lens 270, disposed between the pixel filter 260 and the projection screen 280, thereby displaying the image comprised of M×N pixels on the projection screen 280. The length of the optical path along which the light beam travels from the source stopper 222 to each of the thin film actuated mirrors 242 in the array 240 is identical to that of the optical path along which the light travels from each of the thin film actuated mirrors 242 in the array 240 to the pixel filter 260. This is accomplished by placing the source stopper 222 at a focal point of the field lens 252, a reflecting mirror being disposed between the field lens 252 and the source stopper 222, and the pixel filter 260 at another focal point of the field lens 252. In addition, the light intensity of the optical projection system 200 is at its highest when all of the white light beam that passes through the source aperture 224 of the source stopper 222 is filtered through the pixel filter 260, and this can be accomplished by making the source apertures 224 and the third of the pixel filter 260 be identical in shape and size.

In contrast with the array 140 of the optical projection system 100 of prior art, in the inventive optical projection system 200, the array 240 needs only a third of the number of the actuated mirrors 142 for displaying the image comprised of M×N pixels. This is achieved by incorporating therein a pixel filter 260 between the field lens 252 and the projection lens 270, wherein the pixel filter 260 has a set of color sections 262, 264 and 266 and is placed at a focal point of the field lens 252.

Even though the present invention has been described for an optical projection system incorporating therein a pixel filter 260 having a set of RGB color sections 262, 264 and 266, placed at the focal point of the field lens 252, and hence for allocating a pixel driving time to each of the color sections 262, 264 and 266, the idea presented above can be extended to an optical projection system for use with another type of actuated mirror such as a SLM (spatial light modulator) or a DMD (deformable micro-mirror device) by utilizing therein an optical device capable of modulating a light beam in response to an electric signal applied thereto.

While the present invention has been described with respect to certain preferred embodiments only, other modifications and variations may be made without departing from the spirit and scope of the present invention as set forth in the following claims.

What is claimed is:

1. An optical projection system for displaying an image having M×N pixels, M and N being positive integers, respectively, on a projection screen comprising:

a device for generating a collimated light beam, wherein the collimated light beam has a first, a second and a third primary light components, each of the primary light components being one of primary colors;

a filter for filtering the collimated light beam into each of primary light beams of primary light components, wherein the filter is made of a set of red, green and blue color sections; and an array of M×N actuated mirrors provided with an active matrix, each of the actuated mirrors operable to reflect the collimated light beam from the generating means to any one of the color sections and modulating an intensity of the reflected light beam passing through the filter in response to an electric signal applied to the actuated mirrors by the active matrix, wherein the electric signal from the active matrix includes a plurality of time intervals, wherein each of the time intervals is divided into a first time slot $S_R$, a second time slot $S_G$, and a third time slot $S_B$, each time slot being allocated for adjusting the reflection of the actuated mirrors to a position substantially aligned with each corresponding color section, respectively, thereby displaying the image on the projection screen.

2. The optical projection system of claim 1, wherein a pulse is allocated to each of the-time slots $S_R$, $S_G$ and $S_B$ and its amplitude is selected from one of three predetermined values $V_R$, $V_G$ and $V_B$, each predetermined value corresponding to a value actuating a corresponding mirror to be substantially aligned with each corresponding color section, respectively.

3. The optical projection system of claim 1, wherein the generating means includes:

a light source for generating a light beam;

a source stopper provided with a source aperture for shaping the light beam from the light source into a light beam of a certain configuration;

a source lens for converging the light beam onto the source aperture of the source stopper;

a first optical means for partially reflecting the light beam passing through the source aperture to the array of M×N actuated mirrors; and a second optical means for uniformly impinging the portion of the light beam reflected from the first optical means to the array of M×N actuated mirrors to thereby produce the collimated light beam.

4. The optical projection system of claim 3, wherein the source aperture of the source stopper is placed at one of the focal points of the field lens.

5. An optical projection system for displaying an image having M×N pixels, M and N being positive integers, respectively, on a projection screen comprising:

a light source for generating a light beam;

a source stopper having a source aperture for shaping the light beam from the light source into a light beam of a certain configuration;

a source lens for converging the light beam onto the source aperture of the source stopper;

a first optical means for partially reflecting the light beam passing through the source aperture to the array of M×N actuated mirrors; and a field lens for uniformly impinging the portion of the light beam reflected from the first optical means to the array of M×N actuated mirrors to thereby produce a collimated light beam having a first, a second and a third primary light components, each of the primary light components representing one of primary colors, wherein the source aperture of the source stopper is placed at a focal point of the field lens;

a filter having a set of red, green and blue color sections for filtering the collimated light beam into each of primary light beams of primary light components, wherein the filter is placed at another focal point of the field lens; and an array of M×N actuated mirrors provided with an active matrix, each of the actuated mirrors operable to reflect the collimated light beam from the field lens to any one of the color sections and modulating an intensity of the reflected light beam passing through the filter in response to an electric signal applied to the actuated mirrors by the active matrix, thereby displaying the image on the projection screen.

6. The optical projection system of claim 5, wherein the source aperture of the source stopper is identical to the third of the filter in shape and size.

7. The optical projection system of claim 6, wherein the first optical means is arranged to be out of the optical path of the light beam reflected from the array of M×N actuated mirrors such that the reflected white light beam is focused directly on the filter by the field lens.

* * * * *